United States Patent
Lee (12)

(10) Patent No.: US 6,195,500 B1
(45) Date of Patent: Feb. 27, 2001

(54) PHASE CONTROL APPARATUS FOR VIDEO CASSETTE RECORDER

(75) Inventor: Kwang H. Lee, Kyungki-Do (KR)

(73) Assignee: Goldstar, Co., Ltd. (KR)

( * ) Notice: Subject to any disclaimer, the term of this patent is extended or adjusted under 35 U.S.C. 154(b) by 0 days.

(21) Appl. No.: 08/196,658

(22) Filed: Feb. 14, 1994

(30) Foreign Application Priority Data

Feb. 16, 1993 (KR) .................................................... 93-2065

(51) Int. Cl.⁷ .................................................. H04N 07/18

(52) U.S. Cl. ............................................. 386/78; 386/90

(58) Field of Search .................................. 358/320, 321, 358/338, 337, 339; 360/10.3; 386/70, 78, 90

(56) References Cited

U.S. PATENT DOCUMENTS

| 5,157,513 | * | 10/1992 | Yamashita | 358/338 |
| 5,172,280 | * | 12/1992 | Quintus et al. | 360/31 |
| 5,274,514 | * | 12/1993 | Han | 360/31 |
| 5,282,098 | * | 1/1994 | Ohta et al. | 358/338 |
| 5,319,500 | * | 6/1994 | Yu | 358/320 |
| 5,327,249 | * | 7/1994 | Lee | 358/338 |

FOREIGN PATENT DOCUMENTS 62-36571    8/1987    (JP).

* cited by examiner

Primary Examiner—Andy Rao
(74) Attorney, Agent, or Firm—Ostrolenk, Faber, Gerb & Soffen, LLP

(57) ABSTRACT

A phase control apparatus for a video cassette recorder comprising a control head for reproducing a control signal recorded on a control track of a tape, a control signal amplification circuit for amplifying the reproduced control signal at a varied amplification gain, a control signal wave-shaping circuit for wave-shaping an output signal from the control signal amplification circuit and stabilizing the wave-shaped signal, an amplification gain control circuit for controlling the amplification gain of the control signal amplification circuit in response to an output signal from the control signal wave-shaping circuit, a phase control circuit for detecting an phase error and a rotation speed of a capstan motor in response to the output signal from the control signal wave-shaping circuit and an output frequency from the capstan motor and outputting phase and speed detect signals in accordance with the detected results, and a capstan motor driving circuit for driving the capstan motor in response to the phase and speed detect signals to correct the phase error of the capstan motor. The amplification gain control circuit is provided with a microprocessor for outputting an amplification gain control signal and an amplification gain variation circuit for varying the amplification gain in response to the amplification gain control signal.

3 Claims, 5 Drawing Sheets

PHASE CONTROL APPARATUS FOR VIDEO CASSETTE RECORDER

BACKGROUND OF THE INVENTION

1. Field of the Invention

The present invention relates in general to the phase control of a video cassette recorder (referred to hereinafter as VCR), and more particularly to a phase control apparatus for a VCR in which a control signal reproduced by a control head is amplified at a varied amplification gain and a phase of a capstan motor is accurately detected on the basis of the amplified control signal.

2. Description of the Prior Art

Referring to FIG. 1, there is shown a block diagram of a conventional phase control apparatus for a VCR. As shown in this drawing, the conventional phase control apparatus comprises a control head 20 for reproducing a control signal recorded on a control track under a video track of a tape 10, and a control signal amplification circuit 30 for amplifying the reproduced control signal from the control head 20 at a predetermined amplification gain. The control signal amplification circuit 30 is provided with resistors R1 and R2, condensers C1–C3 and an amplifier OP1.

A control signal wave-shaping circuit 40 is provided in the phase control apparatus to wave-shape an output signal from the control signal amplification circuit 30 and stabilize the wave-shaped signal. The control signal wave-shaping circuit 40 includes a level limiter 41 for wave-shaping the output signal from the control signal amplification circuit 30 and a Schmidt trigger circuit 42 for stabilizing an output signal from the level limiter 41.

A phase control circuit 50 is also provided in the phase control apparatus to detect an phase error and a rotation speed of a capstan motor CM in response to an output signal from the control signal wave-shaping circuit 40 and an output frequency from the capstan motor CM and output phase and speed detect signals in accordance with the detected results to allow a video head to accurately trace the video track of the tape 10. The phase control circuit 50 includes a reference pulse generator 51 for generating a reference pulse signal, a phase detector 52 for comparing a phase of the output signal from the control signal wave-shaping circuit 40 and that of the reference pulse signal from the reference pulse generator 51, detecting the phase error of the capstan motor CM in accordance with the compared result and outputting the phase detect signal in accordance with the detected result, and a speed detector 53 for detecting the rotation speed of the capstan motor CM in response to the output frequency from the capstan motor CM and outputting the speed detect signal in accordance with the detected result.

A capstan motor driving circuit 60 is also provided in the phase control apparatus to drive the capstan motor CM in response to the phase and speed detect signals from the phase control circuit 50. The capstan motor driving circuit 60 is provided with a resistor R3, condensers C4 and C5 and an amplifier OP2.

The operation of the conventional phase control apparatus with the above-mentioned construction will hereinafter be described.

First, the control si-gnal recorded on the control track of the tape 10 is reproduced by the control head 20 and then applied to the control signal amplification circuit 30. In the control signal amplification circuit 30, the amplifier OP1 amplifies the reproduced control signal from the control head 20 at the amplification gain determined by the resistors R1 and R2 and the condensers C1–C3. The output signal from the control signal amplification circuit 30 is applied to the control signal wave-shaping circuit 40.

In the control signal wave-shaping circuit 40, the output signal from the control signal amplification circuit 30 is wave-shaped by the level limiter 41 for removal of a noise component therefrom and then stabilized by the Schmidt trigger circuit 42. The output signal from the Schmidt trigger circuit 42 is applied to the phase control circuit 50.

In the phase control circuit 50, the phase of the output signal from the Schmidt trigger circuit 42 is compared with that of the reference pulse signal from the reference pulse generator 51 by the phase detector 52. As a result of the comparison, the phase detector 52 detects the phase error of the capstan motor CM and outputs the phase detect signal. Also, the output frequency from the capstan motor CM is applied to the speed detector 53, thereby causing the rotation speed of the capstan motor CM to be detected by the speed detector 53. As a result of the detection, the speed detector 53 outputs the speed detect signal.

The phase detect signal from the phase detector 52 is applied to a non-inverting input terminal (+) of the amplifier OP2 in the capstan motor driving circuit 60 and the speed detect signal from the speed detector 53 is applied to an inverting input terminal (−) thereof. The amplifier OP2 amplifies the phase detect signal from the phase detector 52 and the speed detect signal from the speed detector 53 at an amplification gain determined by the resistor R3 and the condensers C4 and C5. Then, an output signal from the amplifier OP2 is applied as a drive signal to the capstan motor CM. As a result, the phase error of the capstan motor CM is corrected by the drive signal from the, capstan motor driving circuit 60 so that the video head can accurately trace the video track of the tape 10.

The above-mentioned operation of the conventional phase control apparatus will hereinafter be described in detail with reference to FIGS. 2 to 5. FIG. 2 is a waveform diagram of the output signal from the control signal amplification circuit 30, FIG. 3 is a waveform diagram of the output signal from the control signal wave-shaping circuit 40, FIG. 4 is a waveform diagram of the output signal from the reference pulse generator 51 in the phase control circuit 50 and FIG. 5 is a waveform diagram of the output signal from the phase detector 52 in the phase control circuit 50.

First, the control signal recorded on the control track of the tape 10 is reproduced by the control head 20 and then amplified by the control signal amplification circuit 30, as shown in FIG. 2. The output signal from the control signal amplification circuit 30 as shown in FIG. 2 is wave-shaped and stabilized by the control signal wave-shaping circuit 40, as shown in FIG. 3. The output signal from the control signal wave-shaping circuit 40 as shown in FIG. 3 is applied to the phase control circuit 50.

In the phase control circuit 50, the phase of the output signal from the control signal wave-shaping circuit 40 as shown in FIG. 3 is compared with that of the reference pulse signal as shown in FIG. 4. The phase detect signal as shown in FIG. 5 is generated as a result of the comparison. When the video head traces accurately the video track, the phase detect signal as shown in FIG. 5 is generated in the middle of a rising edge of the reference pulse signal as shown in FIG. 4. But, in the case where the video head traces inaccurately the video track, the phase detect signal is generated before or after the middle of the rising edge of the reference pulse signal as shown in FIG. 4. This signifies the generation of the phase error of the capstan motor CM. As a result, the capstan motor drive signal is generated to correct the phase error of the capstan motor CM.

However, in the case where the tape is bad in quality or the video head travels missing the video track of the tape, the reproduced control signal is low in level, thereby making the phase control difficult. Also, when a noise component is contained in the control head, it is reproduced and amplified together with the control signal, resulting in the difficulty in the phase control. These may result in a faulty operation of the VCR.

SUMMARY OF THE INVENTION

Therefore, the present invention has been made in view of the above problems, and it is an object of the present invention to provide a phase control apparatus for a VCR in which a control signal reproduced by a control head is amplified at a varied amplification gain and a phase of a capstan motor is controlled on the basis of the amplified control signal, so that a video head can accurately trace a video track, resulting in prevention of a faulty operation of the VCR.

In accordance with the present invention, the above and other objects can be accomplished by a provision of a phase control apparatus for a video cassette recorder comprising a control head for reproducing a control signal recorded on a control track under a video track of a tape; control signal amplification means for amplifying the control signal reproduced by said control head at a varied amplification gain; control signal wave-shaping means for wave-shaping an output signal from said control signal amplification means and stabilizing the wave-shaped signal; amplification gain control means for controlling the amplification gain of said control signal amplification means in response to an output signal from said control signal wave-shaping means; phase control means for detecting an phase error and a rotation speed of a capstan motor in response to the output signal from said control signal wave-shaping means and an output frequency from the capstan motor and outputting phase and speed detect signals in accordance with the detected results; and capstan motor driving means for driving the capstan motor in response to the phase and speed detect signals from said phase control means to correct the phase error of the capstan motor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
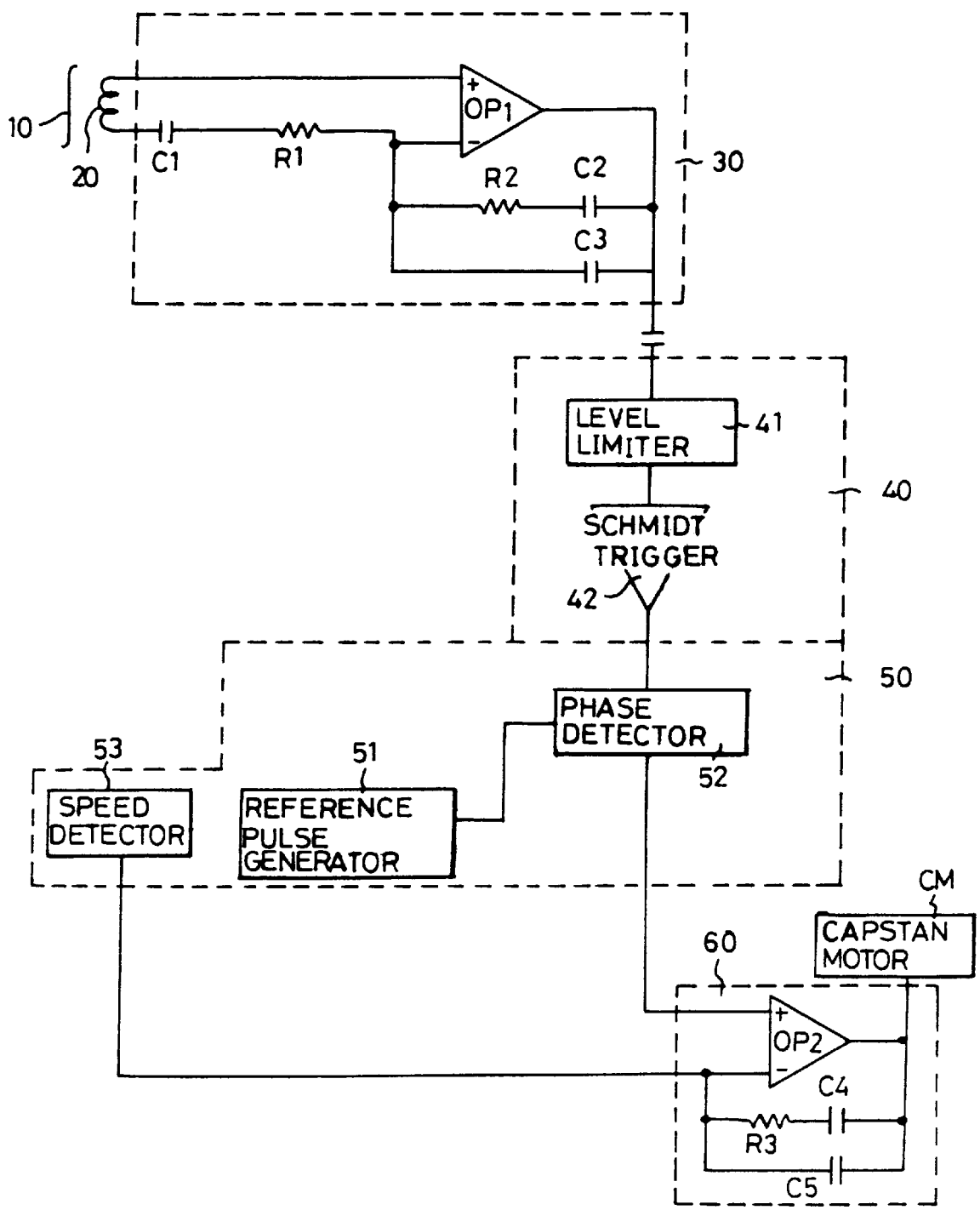
FIG. 1 is a block diagram of a conventional phase control apparatus for a VCR.
Figure 2:
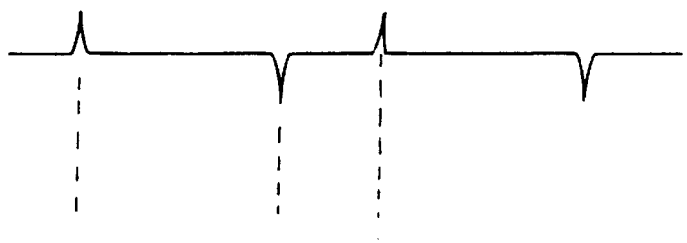
FIG. 2 is a waveform diagram of an output signal from a control signal amplification circuit in FIG. 1.
Figure 3:
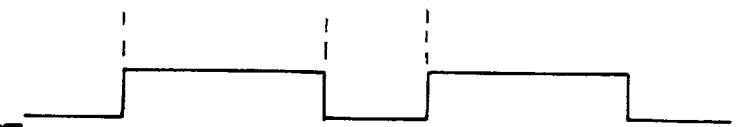
FIG. 3 is a waveform diagram of an output signal from a control signal wave-shaping circuit in FIG. 1.
Figure 4:
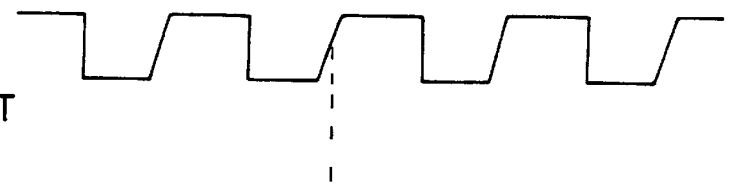
FIG. 4 is a waveform diagram of an output signal from a reference pulse generator in a phase control circuit in FIG. 1.
Figure 5:
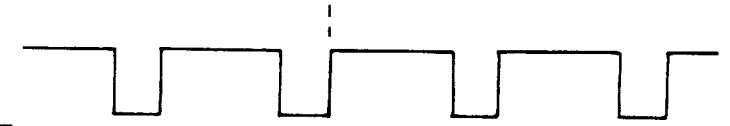
FIG. 5 is a waveform diagram of an output signal from a phase detector in the phase control circuit in FIG. 1.
Figure 6:
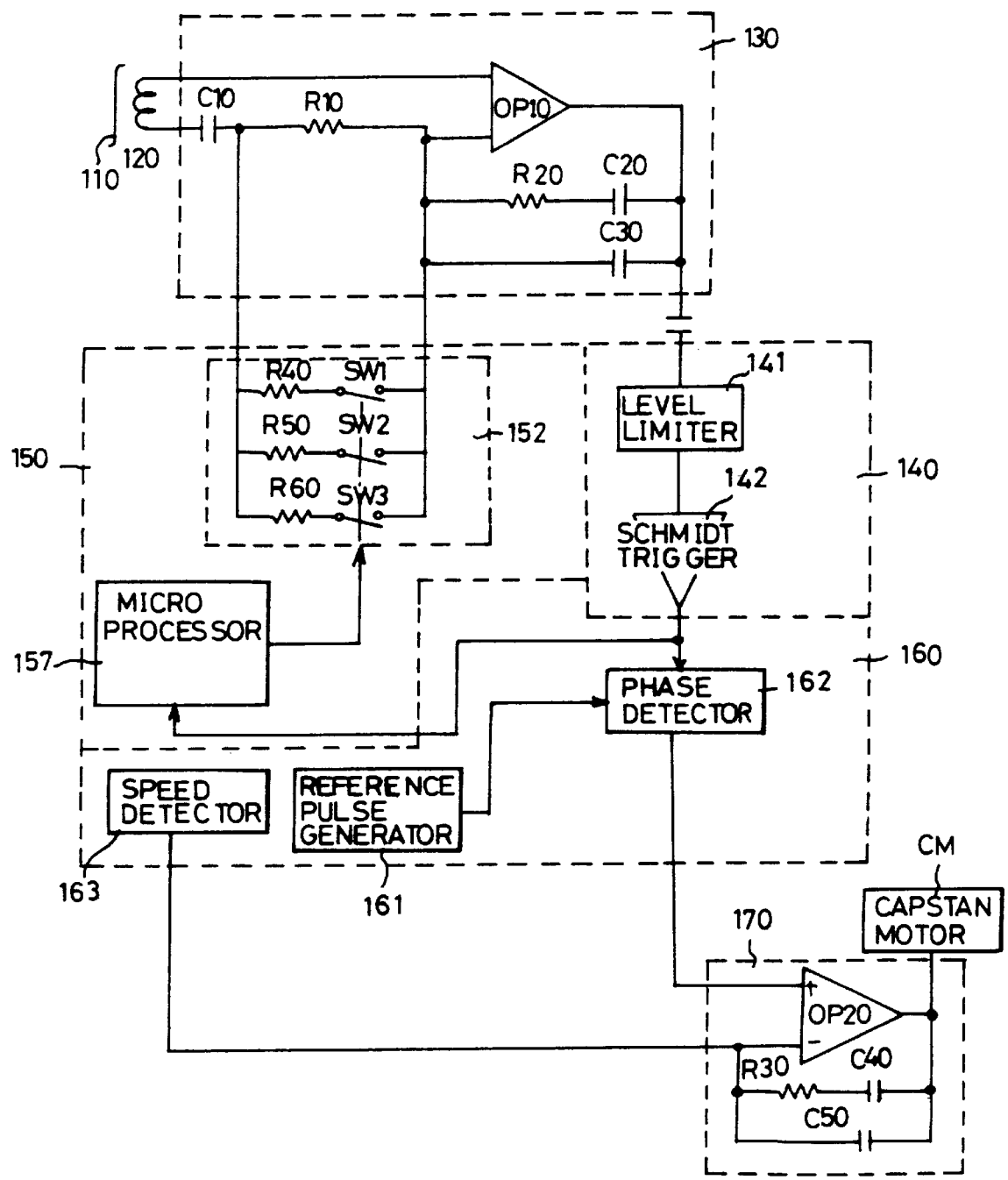
FIG. 6 is a block diagram of a phase control apparatus for a VCR in accordance with the present invention.

Referring to FIG. 6, there is shown a block diagram of a phase control apparatus for a VCR in accordance with the present invention. As shown in this drawing, the phase control apparatus comprises a control head 120 for reproducing a control signal recorded on a control track under a video track of a tape 110, and a control signal amplification circuit 130 for amplifying the reproduced control signal from the control head 120 at a varied amplification gain. The control signal amplification circuit 130 is provided with resistors R10 and R20, condensers C10–C30 and an amplifier OP10.

A control signal wave-shaping circuit 140 is provided in the phase control apparatus to wave-shape an output signal from the controls signal amplification circuit 130 and stabilize the wave-shaped signal. The control signal wave-shaping circuit 140 includes a level limiter 141 for wave-shaping the output signal from the control signal amplification circuit 130 and a Schmidt trigger circuit 142 for stabilizing an output signal from the level limiter 141.

An amplification gain control circuit 150 is also provided in the phase control apparatus to control the amplification gain of the control signal amplification circuit 130 in response to an output signal from the control signal wave-shaping circuit 140. The amplification gain control circuit 150 includes a microprocessor 151 for counting the output signal from the control signal wave-shaping circuit 140 for a predetermined time period, discriminating whether the counted value is the same as a predetermined reference value, fixing the amplification gain of the control signal amplification circuit 130 if the counted value is the same as the predetermined reference value and outputting an amplification gain control signal if the counted value is not the same as the predetermined reference value, so that the amplification gain of the control signal amplification circuit 130 can be varied until the counted value is the same as the predetermined reference value. Also, the amplification gain control circuit 150 includes an amplification gain variation circuit 152 for varying the amplification gain of the control signal amplification circuit 130 in response to the amplification gain control signal from the microprocessor 151. The amplification gain variation circuit 152 includes resistors R40–R60 for setting amplification gains and switches SW1–SW3 being turned on/off in response to the amplification gain control signal from the microprocessor 151 to add a selected one of the amplification gains set by the resistors R40–R60 to the amplification gain of the control signal amplification circuit 130.

A phase control circuit 160 is also provided in the phase control apparatus to detect an phase error and a rotation speed of a capstan motor CM in response to the output signal from the control signal wave-shaping circuit 140 and an output frequency from the capstan motor CM and output phase and speed detect signals in accordance with the detected results to allow a video head to accurately trace the video track of the tape 110. The phase control circuit 160 includes a reference pulse generator 161 for generating a reference pulse signal, a phase detector 162 for comparing a phase of the output signal from the control signal wave-shaping circuit 140 and that of the reference pulse signal from the reference pulse generator 161, detecting the phase error of the capstan motor CM in accordance with the compared result and outputting the phase detect signal in accordance with the detected result, and a speed detector 163 for detecting the rotation speed of the capstan motor CM in response to the output frequency from the capstan motor CM and outputting the speed detect signal in accordance with the detected result.

A capstan motor driving circuit 170 is also provided in the phase control apparatus to drive the capstan motor CM in response to the phase and speed detect signals from the phase control circuit 160 to correct the phase error of the capstan motor CM. The capstan motor driving circuit 170 is provided with a resistor R30, condensers C40 and C50 and an amplifier OP20.

The operation of the phase control apparatus with the above-mentioned construction in accordance with the present invention will hereinafter be described in detail.

First, the control signal recorded on the control track of the tape 110 is reproduced by the control head 120 and then applied to the control signal amplification circuit 130. In the control signal amplification circuit 130, the amplifier OP10 amplifies the reproduced control signal from the control head 120 at the amplification gain determined by the resistors R10 and R20 and the condensers C10–C30. The output signal from the control signal amplification circuit 130 is applied to the control signal wave-shaping circuit 140.

In the control signal wave-shaping circuit 140, the output signal from the control signal amplification circuit 130 is wave-shaped by the level limiter 141 for removal of a noise component therefrom and then stabilized by the Schmidt trigger circuit 142. The output signal from the Schmidt trigger circuit 142 is applied to the amplification gain control circuit 150.

Figure 13:
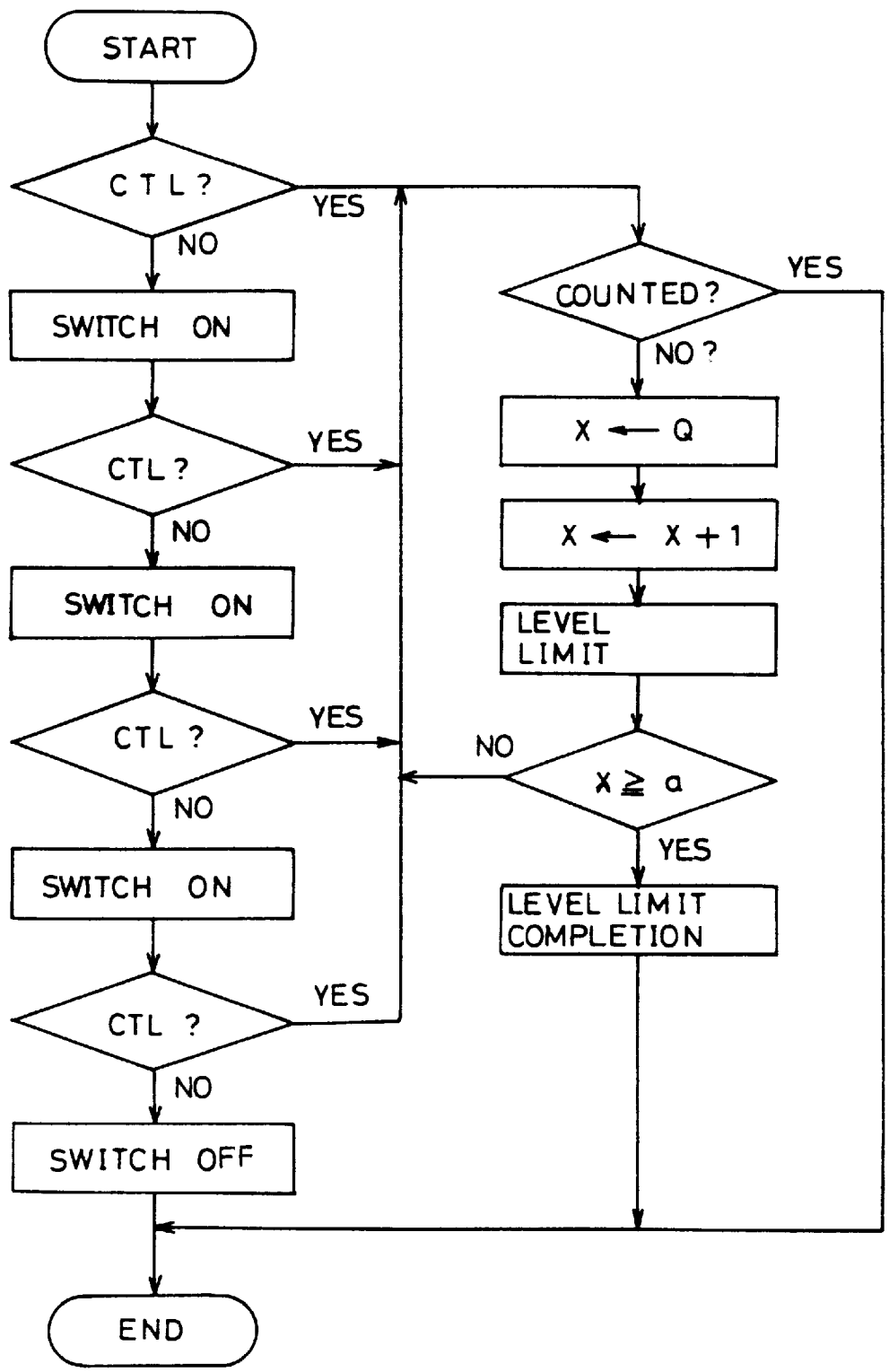
FIG. 13 is a flowchart illustrating an operation of a microprocessor in FIG. 6 which varies the amplification vain of the control signal amplification circuit in FIG. 6.

In the amplification gain control circuit 150, as shown in FIG. 13 which is a flowchart illustrating the operation of the microprocessor 151 which varies the amplification gain of the control signal amplification circuit 130, the microprocessor 151 counts the output signal from the control signal wave-shaping circuit 140 for the predetermined time period (typically 1/30 sec), discriminates whether the counted value is the same as the predetermined reference value and outputs the amplification gain control signal in accordance with the discriminated result. The amplification gain control signal from the microprocessor 151 is applied to the amplification gain variation circuit 152.

In the amplification gain variation circuit 152, one of the switches SW1–SW3 is turned on in response to the amplification gain control signal from the microprocessor 151 and the corresponding one of the resistors R40–R60 is thus selected. Then, the amplification gain set by the selected one of the resistors R40–R60 is added to the amplification gain of the control signal amplification circuit 130. As a result, the control signal reproduced by the control head 120 is amplified at the varied amplification gain by the control signal amplification circuit 130.

The output signal from the Schmidt trigger circuit 142 is also applied to the phase control circuit 160. In the phase control circuit 160, the phase of the output signal from the Schmidt trigger circuit 142 is compared with that of the reference pulse signal from the reference pulse generator 161 by the phase detector 162. As a result of the comparison, the phase detector 162 detects the phase error of the capstan motor CM and outputs the phase detect signal. Also, the output frequency from the capstan motor CM is applied to the speed detector 163, thereby causing the rotation speed of the capstan motor CM to be detected by the speed detector 163. As a result of the detection, the speed detector 163 outputs the speed detect signal.

The phase detect signal from the phase detector 162 is applied to a non-inverting input terminal (+) of the amplifier OP20 in the capstan motor driving circuit 170, an inverting input terminal (−) of which is applied with the speed detect signal from the speed detector 163. The amplifier OP20 amplifies the phase detect signal from the phase detector 162 and the speed detect signal from the speed detector 163 at an amplification gain determined by the resistor R30 and the condensers C40 and C50. Then, an output signal from the amplifier OP20 is applied as a drive signal to the capstan motor CM. As a result, the phase error of the capstan motor CM is corrected by the drive signal from the capstan motor driving circuit 170 so that the video head can accurately trace the video track of the tape 110.

Figure 7:
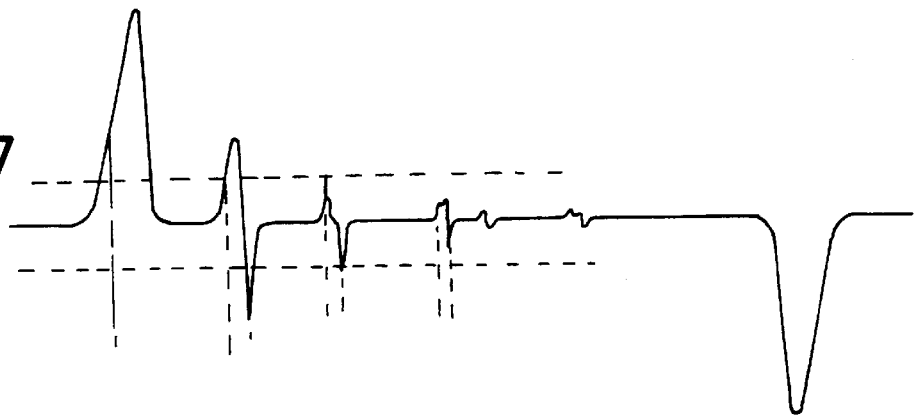
FIG. 7 is a waveform diagram of an output signal from a control signal amplification circuit in FIG. 6.
Figure 8:
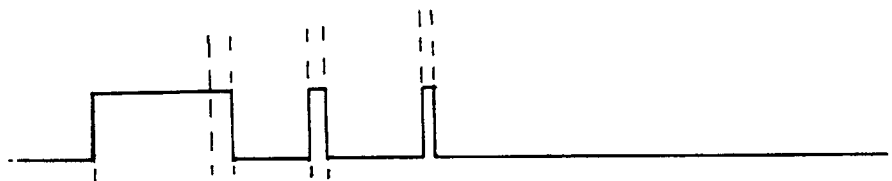
FIG. 8 is a waveform diagram of an output signal from a level limiter in a control signal wave-shaping circuit in FIG. 6.
Figure 9:
FIG. 9 is a waveform diagram of an output signal from a Schmidt trigger circuit in the control signal wave-shaping circuit in FIG. 6.

The above-mentioned operation of the phase control apparatus in accordance with the present invention will hereinafter be described in more detail with reference to FIGS. 7 to 12. FIG. 7 is a waveform diagram of the output signal from the control signal amplification circuit 130, FIG. 8 is a waveform diagram of the output signal from the level limiter 141, FIG. 9 is a waveform diagram of the output signal from the Schmidt trigger circuit 142, FIG. 10 is a waveform diagram of the output signal from the Schmidt trigger circuit 142 when a noise component is contained in the control head 120, FIG. 11 is a waveform diagram of the output signal from the Schmidt trigger circuit 142 when the video head travels missing the video track of the tape 110 and FIG. 12 is a waveform diagram of the output signal from the Schmidt trigger circuit 142 when the control signal reproduced by the control head 120 is amplified at the varied amplification gain by the control signal amplification circuit 130.

First, the control signal recorded on the control track of the tape 110 is reproduced by the control head 120 and then amplified by the control signal amplification circuit 130, as shown in FIG. 7. The output signal from the control signal amplification circuit 130 as shown in FIG. 7 is wave-shaped as shown in FIG. 8 by the level limiter 141 and then triggered as shown in FIG. 9 by the Schmidt trigger circuit 142.

Figure 10:
FIG. 10 is a waveform diagram of the output signal from the Schmidt trigger circuit in the control signal wave-shaping circuit in FIG. 6 when a noise component is contained in a control head.
Figure 11:
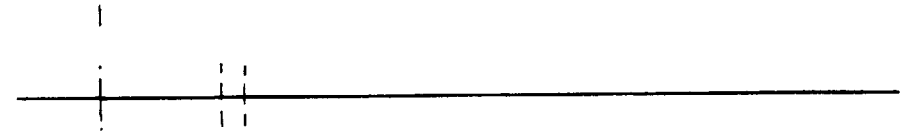
FIG. 11 is a waveform diagram of the output signal from the Schmidt trigger circuit in the control signal wave-shaping circuit in FIG. 6 when a video head travels missing a video track of a tape.
Figure 12:
FIG. 12 is a waveform diagram of the output signal from the Schmidt trigger circuit in the control signal wave-shaping circuit in FIG. 6 when a control signal reproduced by the control head is amplified at a varied amplification gain by the control signal amplification circuit in FIG. 6.

By the way, if the signal from the Schmidt trigger circuit 142 is outputted as shown in FIGS. 10 and 11, the microprocessor 151 outputs the amplification gain control signal to vary the amplification gain of the control signal amplification circuit 130. As a result, the control signal reproduced by the control head 120 is amplified to a predetermined level at the varied amplification gain. Then, the output signal from the control signal amplification circuit 30 is wave-shaped and stabilized by the control signal wave-shaping circuit 140, as shown in FIG. 12. In response to the output signal from the control signal wave-shaping circuit 140 as shown in FIG. 12, the microprocessor 151 discriminates that the control signal is accurately reproduced by the control head 120 and thus fixes the amplification gain of the control signal amplification circuit 130.

The output signal from the Schmidt trigger circuit 142 is also applied to the phase control circuit 160. Then, the phase error of the capstan motor CM is corrected as a result of the comparison of the output signal from the Schmidt trigger circuit 142 and the reference pulse signal from the reference pulse generator 161.

As apparent from the above description, according to the present invention, in the case where the reproduced control signal is low in level because the tape is bad in quality or the video head travels missing the video track of the tape, it is amplified at the varied amplification gain. Therefore, the phase of the capstan motor can accurately be controlled by the amplified control signal. This has the effect of preventing a faulty operation of the VCR.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A phase control apparatus for a video cassette recorder, comprising:

a control head for reproducing a control signal recorded on a control track under a video track of a tape;

control signal amplification means for amplifying the control signal reproduced by said control head at a varied amplification gain;

control signal wave-shaping means for wave-shaping an output signal from said control signal amplification means and stabilizing a wave-shaped output signal;

amplification gain control means for controlling the amplification gain of said control signal amplification means in response to a counted number of pulses of an output signal from said control signal wave-shaping means over a predetermined time period;

phase control means for detecting a phase error and a rotation speed of a capstan motor in response to the wave-shaped output signal from said control signal wave-shaping means and an output frequency from the capstan motor and outputting phase and speed detect signals in accordance with detected results; and capstan motor driving means for driving the capstan motor in response to the phase and speed detect signals from said phase control means to correct the phase error of the capstan motor.

2. A phase control apparatus for a video cassette recorder as set forth in claim 1, wherein said amplification gain control means includes:

a microprocessor for counting the pulses of the output signal from said control signal wave-shaping means over said predetermined time period, for discriminating whether a counted value is identical to a predetermined reference value, for fixing the amplification gain of said control signal amplification means if the counted value is as identical to the predetermined reference value and for outputting an amplification gain control signal if the counted value is not the same as the predetermined reference value, so that the amplification gain of said control signal amplification means can be varied until the counted value is identical to the predetermined reference value; and amplification gain variation means for varying the amplification gain of said control signal amplification means in response to the amplification gain control signal from said microprocessor.

3. A phase control apparatus for a video cassette recorder as set forth in claim 2, wherein said amplification gain variation means includes:

a plurality of resistors for setting amplification gains; and a plurality of switches being turned on/off in response to the amplification gain control signal from said microprocessor to add a selected one of the amplification gains set by said resistors to the amplification gain of said control signal amplification means.

* * * * *